(12) United States Patent
He et al.

(10) Patent No.: US 6,999,656 B1
(45) Date of Patent: Feb. 14, 2006

(54) OPTICAL DEVICE WITH CONCAVE MIRROR

(75) Inventors: Chun He, Frement, CA (US); Tsay Wei-Shin, Saratoga, CA (US)

(73) Assignee: Alliance Fiber Optic Products, Inc., Sunnyvale, CA (US)

(*) Notice: Subject to any disclaimer, the term of this patent is extended or adjusted under 35 U.S.C. 154(b) by 14 days.

(21) Appl. No.: 10/794,081

(22) Filed: Mar. 4, 2004

(51) Int. Cl.
*G02B 6/26* (2006.01)

(52) U.S. Cl. .......................................... 385/31; 385/47

(58) Field of Classification Search ................. 385/14, 385/18, 24, 27, 31, 39, 42, 47, 50, 5
See application file for complete search history.

(56) References Cited

U.S. PATENT DOCUMENTS

| | | | |
|---|---|---|---|
| 5,612,824 A | 3/1997 | Si | |
| 5,799,121 A | 8/1998 | Duck | |
| 6,416,234 B1 * | 7/2002 | Wach et al. | 385/70 |
| 6,512,863 B1 * | 1/2003 | Lewis | 385/18 |
| 2003/0048980 A1 * | 3/2003 | Hoen | 385/18 |
| 2003/0048983 A1 * | 3/2003 | Abel | 385/22 |
| 2004/0047561 A1 * | 3/2004 | Tuda | 385/39 |
| 2004/0208581 A1 * | 10/2004 | Li et al. | 398/85 |

* cited by examiner

*Primary Examiner*—John D. Lee
*Assistant Examiner*—James D. Stein
(74) *Attorney, Agent, or Firm*—Joe Zheng

(57) ABSTRACT

New designs of optical devices, particularly for adding or dropping a selected wavelength or a group of wavelengths are disclosed. In one aspect, no collimators or the like are used. Instead, two fibers are coupled effectively via a concave mirror. Depending on the shape of the concave mirror that may have a shape substantially similar to a portion of an oblate spheroid or sphere, the facets or tips of these two fibers are positioned near or upon the foci of the oblate spheroid or the center of the sphere. Utilizing the special characteristics of the concave mirror, these two fibers can be optically coupled with minimal loss and without the use of any optical collimators.

25 Claims, 6 Drawing Sheets

OPTICAL DEVICE WITH CONCAVE MIRROR

BACKGROUND OF THE INVENTION

1. Field of the Invention

The invention is generally related to the area of optical communications. In particular, the invention is related to optical devices using one or more concave mirrors to process light beams and the making thereof. The optical devices include, but may not be limited to, multiplexing devices and adding/dropping devices.

2. The Background of Related Art

The future communication networks demand ever increasing bandwidths and flexibility to different communication protocols. Fiber optic networks are becoming increasingly popular for data transmission due to their high speed and high capacity capabilities. Wavelength division multiplexing (WDM) is an exemplary technology that puts data from different sources together on an optical fiber with each signal carried at the same time on its own separate light wavelength. Using the WDM system, up to 80 (and theoretically more) separate wavelengths or channels of data can be multiplexed into a light stream transmitted on a single optical fiber. To take the benefits and advantages offered by the WDM system, there require many sophisticated optical network elements.

Optical add/drop devices are those elements often used in optical systems and networks. For example, an exchanging of data signals involves the exchanging of matching wavelengths from two different sources within an optical network. In other words, the multi-channel signal would drop a wavelength while simultaneously adding a channel with a matching wavelength at the same network node.

A commonly used WDM device is what is called a three-port device. FIG. 1 shows a functional diagram of a three-port add/drop device 100. The optical device 100 includes a common (C) port 102, a reflection (R) port 104, and a transmission (T) port 106. When the device 100 is used as a multiplexer (i.e., to add a signal at a selected wavelength $\lambda_K$ to other signals at wavelengths other than the selected wavelength $\lambda_K$), the T-port 106 receives a light beam at the selected wavelength $\lambda_K$ that is to be multiplexed into a group of beams at wavelengths $\lambda_1, \lambda_2, \ldots \lambda_N$ excluding the selected wavelength $\lambda_K$ coupled in from the R-port 104. The C-port 102 subsequently produces a multiplexed signal including all wavelengths $(\lambda_1, \lambda_2, \ldots \lambda_K, \ldots \lambda_N)$.

Likewise, when the optical device 100 is used to demultiplex signals, the C-port 102 receives a group of signals with wavelengths $\lambda_1, \lambda_2, \ldots \lambda_K, \ldots \lambda_N$. The T-port 106 passes a signal with the selected wavelength $\lambda_K$ while the R-port 104 subsequently bypasses the rest of the input signals wavelengths $\lambda_1, \lambda_2, \ldots \lambda_N$ except for the selected wavelength $\lambda_x$.

FIG. 2 shows an exemplary internal configuration 110 of the optical device 100 of FIG. 1. As shown in FIG. 2, there is a first GRIN lens 112, an optical filter 114 (e.g., a multi-layer thin film filter) and a second GRIN lens 116. In general, a dual-fiber pigtail is provided in a holder 118 (e.g., a dual-fiber pigtail collimator) and coupled to or positioned towards the first GRIN lens 112, and a single-fiber pigtail is provided in a second holder 120 and coupled to or positioned towards the second GRIN lens 116. Essentially the two GRIN lenses 112 and 116 accomplish the collimating means for coupling an optical signal with multi channels or wavelengths in and out of the C port 102, the R port 104, or the T port 106. In general, the three-port device 100 is known to have a very low coupling loss from the C-port to both the R-port and the T-port for use as a demultiplexing device, or vise versa as a multiplexing device.

Such three-port WDM device has fewer components involved and therefore a larger tolerance window for high yield. However, it has been well-known that there is substantial disadvantage of such WDM device made through the traditional 3-port device: it is of high cost, requiring two GRIN lenses, one dual-fiber pigtail, one-single fiber pigtail, an optical filter, and packaging glass tubes and/or metal tubes.

In applications, when used to form multi-channel multiplexiers or demultiplexiers, or add/drop multiplexiers (OADMs), a plurality of such three-port devices need to be cascaded together through fiber splicing. The resulting costs of the multi-channel WDM or multi-channel OADM are very high. In general a package, typically a cassette, or a chassis, will be used to enclose the fiber spliced and the cascaded 3-port devices, adding additional costs.

Accordingly, there is a great need for improved optical devices that are amenable to low cost, especially for individual WDM device, as well as for cascaded, multi-channel WDM devices.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

In general, the present invention pertains to improved designs of optical devices, particularly for adding or dropping a selected wavelength or a group of wavelengths. For simplicity, a group of selected wavelengths or channels will be deemed or described as a selected wavelength hereinafter. According to one aspect of the present invention, no collimators or the like are used. Instead, two fibers are coupled effectively via a concave mirror. Depending on the shape of the concave mirror that may have a shape substantially similar to a portion of an oblate spheroid or sphere, the facets or tips of these two fibers are positioned near or upon the foci of the oblate spheroid or the center of the sphere. Utilizing the special characteristics of the concave mirror, these two fibers can be optically coupled with minimal loss and without the use of any optical collimators.

According to another aspect of the present invention, a second concave mirror is used to couple a light beam reflected from one of the two fibers to a third fiber. As a result, add/drop optical devices in accordance with the present invention are amenable to small footprint, broad operating wavelength range, enhanced impact performance, lower cost, and easier manufacturing process.

According to still another aspect of the present invention, a fourth fiber can be added to form a four-port device such that cascading such four port devices would perform much better than those of the four port devices based on fiber splicing.

According to one embodiment, the present invention is an optical apparatus comprising a first concave mirror; a first fiber emitting a light beam including wavelengths $\lambda_1, \lambda_2, \lambda_3, \ldots \lambda_k \ldots \lambda_n$ towards the first concave mirror; and a second fiber coated at its facet with an optical filtering film configured to transmit a selected wavelength $\lambda_k$ and reflect all others, the first concave mirror reflecting the light beam to the second fiber, resulting in a signal at the selected wavelength $\lambda_k$ to transmit through.

The reflected beam by the $2^{nd}$ fiber facet contains wavelengths, $\lambda_1, \lambda_2, \lambda_3, \ldots \lambda_n$, is directed towards a 2nd concave mirror, and being focused and reflected by the 2nd concave mirror to the third fiber, which may be coated with a film that allows to pass all the wavelengths including $\lambda_1, \lambda_2, \lambda_3, \ldots \lambda_n$.

According to another embodiment, the present invention is an optical apparatus comprising a first concave mirror, a second concave mirror, a first fiber emitting a light beam towards the first concave mirror, the light beam including wavelengths $\lambda_1, \lambda_2, \lambda_3, \ldots \lambda_n$ that do not include a selected wavelength $\lambda_k$, a second fiber coated at its facet with an optical filtering film configured to transmit the selected wavelength $\lambda_k$ and reflect all others, the second fiber emitting a signal at the selected wavelength $\lambda_k$ through the optical filtering film, the signal at the selected wavelength $\lambda_k$ being multiplexed with the light beam reflected by the first concave mirror to produce a multiplexed signal that goes to the second concave mirror, and a third fiber being positioned to receive the multiplexed signal that is reflected by the second concave mirror.

One of the objects, features, advantages of the present invention is to provide optical add/drop devices that are amenable to small footprint, broad operating wavelength range, enhanced impact performance, lower cost, and easier manufacturing process.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENT

The present invention pertains to new designs of optical devices particularly used to add a selected wavelength or a group of wavelength to other wavelengths or drop a selected wavelength or a group of wavelength from a light beam. According to one aspect of the present invention, no collimators or the like are used. Instead, two fibers are coupled via a concave mirror. Depending on the shape of the concave mirror that may have a shape substantially similar to a portion of an oblate spheroid or sphere, the facets or tips of these two fibers are positioned near or upon the foci of the oblate spheroid or the center of the sphere. Significantly departing from the prior art devices, these two fibers are optically coupled with minimal loss and without the use of any optical collimators.

According to another aspect of the present invention, a second concave mirror is used to couple a light beam reflected from one of the two fibers to a third fiber. As a result, add/drop optical devices in accordance with the present invention are amenable to small footprint, broad operating wavelength range, enhanced impact performance, lower cost, and easier manufacturing process.

The detailed description of the present invention is presented largely in terms of procedures, steps, logic blocks, processing, or other symbolic representations that directly or indirectly resemble the operations of optical devices or systems that can be used in optical networks. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 3A:
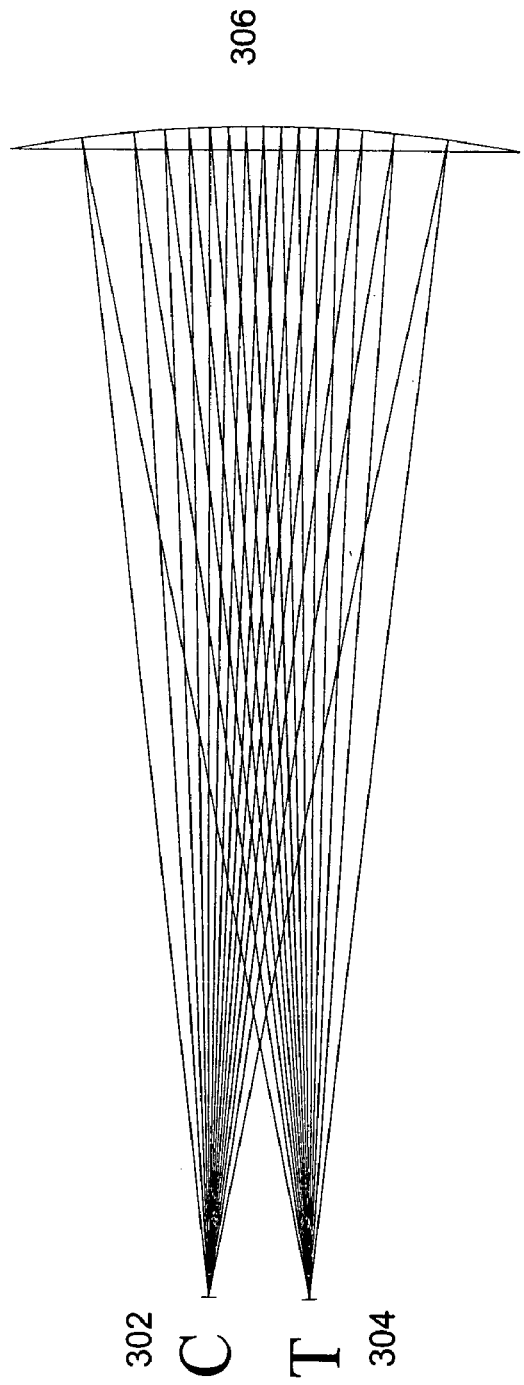
FIG. 3A shows a portion or a configuration of an optical device that may include, but not be limited to, an add/drop device for multiplexing (adding) a signal (at a selected wavelength) into others or demultiplexing (dropping) a signal out of a group of signals.

Referring now to the drawings, in which like numerals refer to like parts throughout the several views. FIG. 3A shows a portion or a configuration 300 of an optical device that may include, but not be limited to, an add/drop device for multiplexing (adding) a signal (at a selected wavelength) into others or demultiplexing (dropping) a signal out of a group of signals. The configuration 300 shows light coupling between an emitting fiber 302 and a receiving fiber 304 via a concave mirror 306. As used herein, the emitting fiber 302 or the receiving fiber 304 means an end or facet of a fiber a light beam may come out from or impinge upon. With the unique characteristics of the concave mirror 306 together with an optical filtering film deposited on the receiving fiber 304, a selected wavelength in a light beam from the emitting fiber 302 can be efficiently transmitted through the receiving fiber 304.

One of the important features in the configuration 300 is that there are no optical collimators or the like, essentially no beam collimation techniques are involved, which saves substantially in terms of the cost of the optical device. In operation, an input light beam emitted from the emitting fiber 302 labeled as C (i.e., a common channel or C-channel) is confined within a cone. In optics, a cone is used to measure how light spreads out after leaving a fiber. The half-angle of the cone is determined by the indexes of the core and cladding of the fiber. For example, SMF-28 fiber from Corning Inc. at near 1.5 $\mu$m has an angle of 5.43°.

Figure 3C:
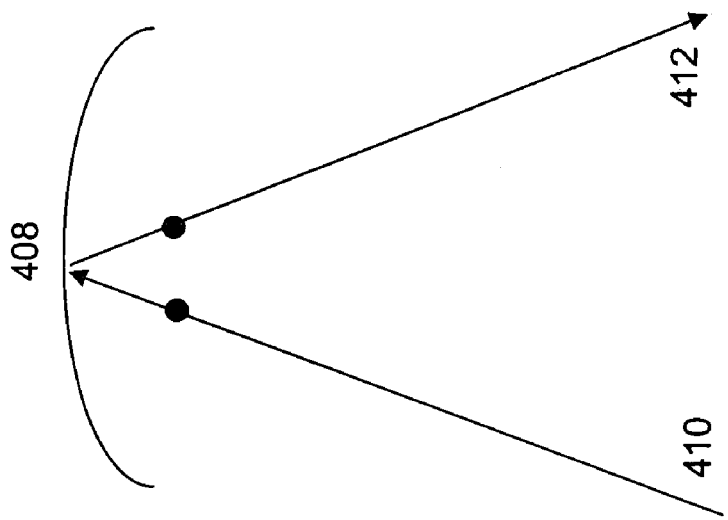
FIG. 3C shows an ellipse (i.e. a projected view of an concave mirror) receiving an incident light beam from one of the two foci thereof and reflecting the incident light beam via another one of the two foci thereof.
Figure 3B:
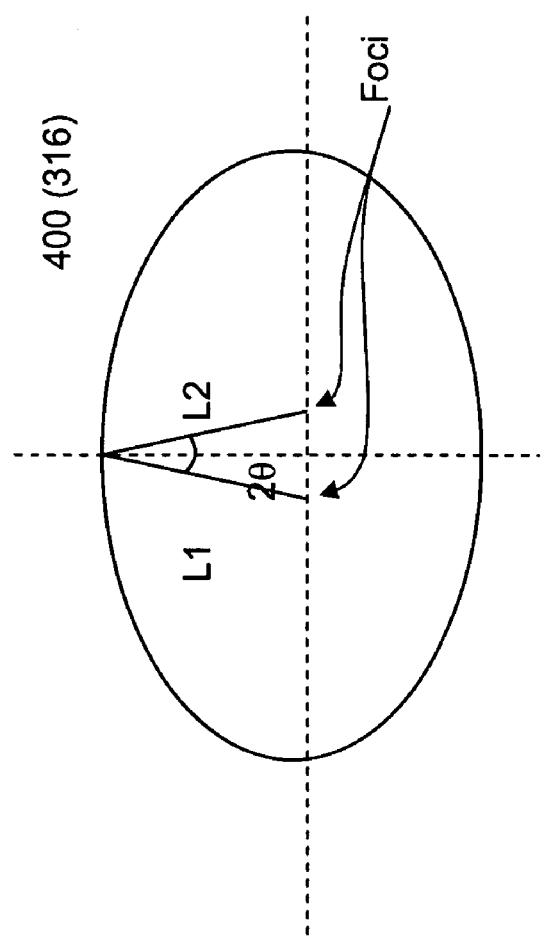
FIG. 3B illustrates an example of an concave mirror shaped in a portion of an oblate spheroid, where a complete ellipse is shown to facilitate the understanding of the mirror.

According to one embodiment, the concave mirror 316 is one part of an oblate spheroid, as illustrated in FIG. 3B, with distances L1 and L2, from its foci to its reflection surface. It is well known that an ellipse has the characteristics in which a light beam coming from one of the two foci will be reflected out through another one of the foci as shown in FIG. 3C, which is also true for an oblate spheroid. When both the emitting fiber 302 and the receiving fiber 304 are positioned on or substantially close to the two foci of the concave mirror 316, the input light beam which may be diverse impinges on the concave mirror 306 and is then reflected or imaged back to the receiving fiber 304 labeled as T (i.e., a transmission channel or T-channel).

According to another embodiment, the concave mirror 316 is a spherical concave mirror. As a result, the couplings to fiber facets may not be perfect. However, simulation results have demonstrated that if the radius of the spherical concave mirror is much larger than the spacing between the fibers, the losses are minimal.

Using tray tracing, it is found that for achieving minimal loss between the two coupled fibers 302 and 304, the two fiber tips must be placed at a distance substantially equal to the radius of the concave mirror 306, and the two fibers have to be in proximity close to each other. It is also found, through the ray tracing, if the two fibers 302 and 304 cannot be placed at close proximity, the orientations of the two fibers 302 and 304 have to be tilted to achieve minimal coupling loss. The tilting angle depends on the distance between the fiber tips and the radius of the concave mirror 306.

Figure 4:
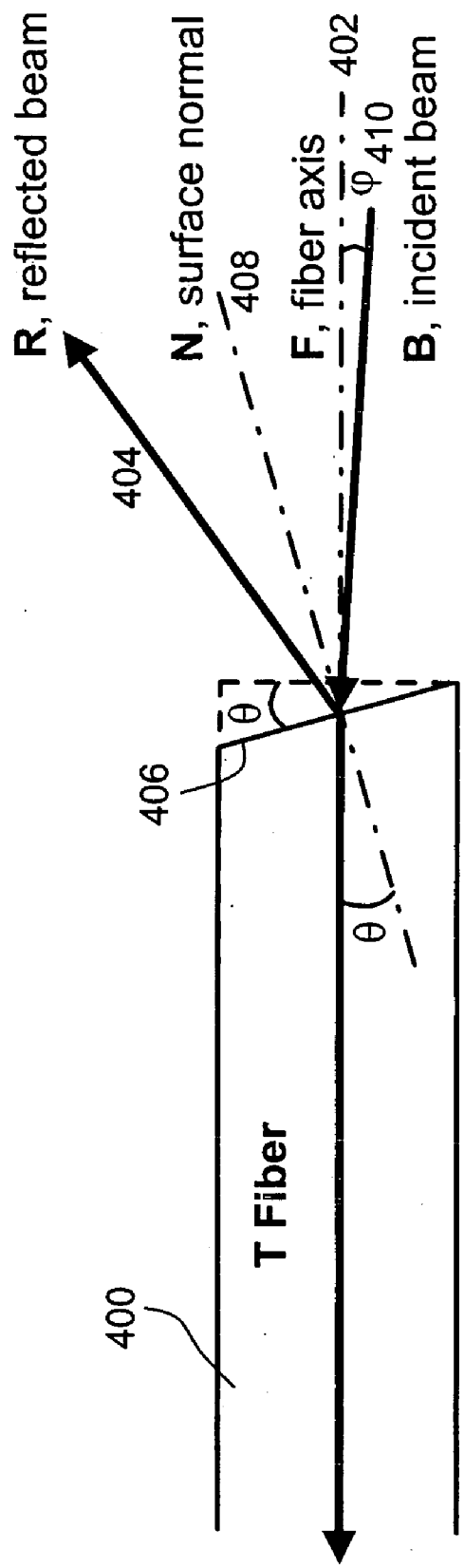
FIG. 4 shows a detailed view of a fiber being coated with an optical filtering film at its slanted surface or facet along with optical paths, and its mechanical axis.

In one embodiment, the concave mirror has a radius R=10 mm, the gap between the two fiber tip g=0.8 mm, the fiber tilting angle $\alpha$=2.28°. Generally, fiber end faces are made to have a slanted facet or surface 406 at an angle $\theta$ for the purpose of reducing back reflection as shown in FIG. 4. Typically, $\theta$=8° is widely adopted. With such slanted surface, the center ray emitted from (or imaged to) such fiber is no longer in alignment with the mechanical axis of the fiber but shows a refracted angle of $\phi$=3.65°, when the light wavelength is near 1.5 $\mu$m.

As illustrated in FIG. 3A and FIG. 4, the fiber 400 has a mechanical axis 402 that is also referred to as a fiber axis, namely extending along the center of the fiber 400. An optical path 404, shown as a reflected beam, is symmetric to another optical path, shown as an incident beam 410, about a surface normal 408. The surface normal 408 is perpendicular to the slanted surface 406. In other words, if the incident beam 410 is projected onto the slanted surface 406 as shown, the reflected light thereof will go along with the optical path 404 shown as the reflected beam. In practice, both of the optical paths 404 and 410 are dependent on the angle of the slanted surface 406.

According to one aspect of the present invention, the end facet of the receiving fiber, namely, the slanted surface 406 of FIG. 4, can be coated with a type of film configured to transmit a selected wavelength and reflect others. Such film has been widely used for making fiber optic component by depositing on glass substrates or fiber tips. One exemplary such type of film is WDM film. In operation and in reference to FIG. 3, a light beam having wavelengths $\lambda_1, \lambda_2, \lambda_3, \ldots, \lambda_k, \ldots, \lambda_n$ is emitted from the emitting fiber 302 of FIG. 3 and hits the concave mirror 306 that reflects the light beam to the receiving fiber 304 but only the signal at the selected wavelength $\lambda_k$ transmits through the film and signals at the rest of the wavelengths ($\lambda_1, \lambda_2, \lambda_3, \ldots, \lambda_n$ excluding $\lambda_k$) are reflected back to the concave mirror 306 but along the optical axis thereof.

As shown in detail in FIG. 4, the receiving fiber 304 is so positioned that the reflected light beam from the concave mirror 306 impinges onto the receiving fiber 304 at a small incident angle $\phi$. In one embodiment, the angle $\phi$=3.65° is to ensure the light of wavelengths $\lambda_i$ is transmitted into the receiving fiber 304 at minimal loss. Further, the reflected light with wavelengths ($\lambda_1, \lambda_2, \lambda_3, \ldots, \lambda_n$ excluding $\lambda_k$) is reflected from the slanted surface 406 at a relative angle $\theta+\phi$=11.65° (with $\theta$=5.43°) with respect to the surface normal 408. In fact, the reflected light is separated from the incident light beam by an angle as large as of 23.3°.

Figure 1:
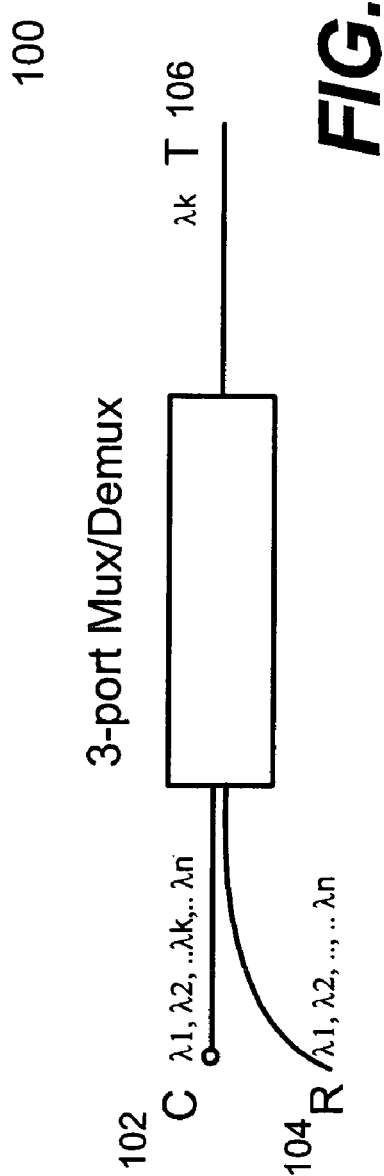
FIG. 1 shows a function diagram of a three-port add/drop device.
Figure 2:
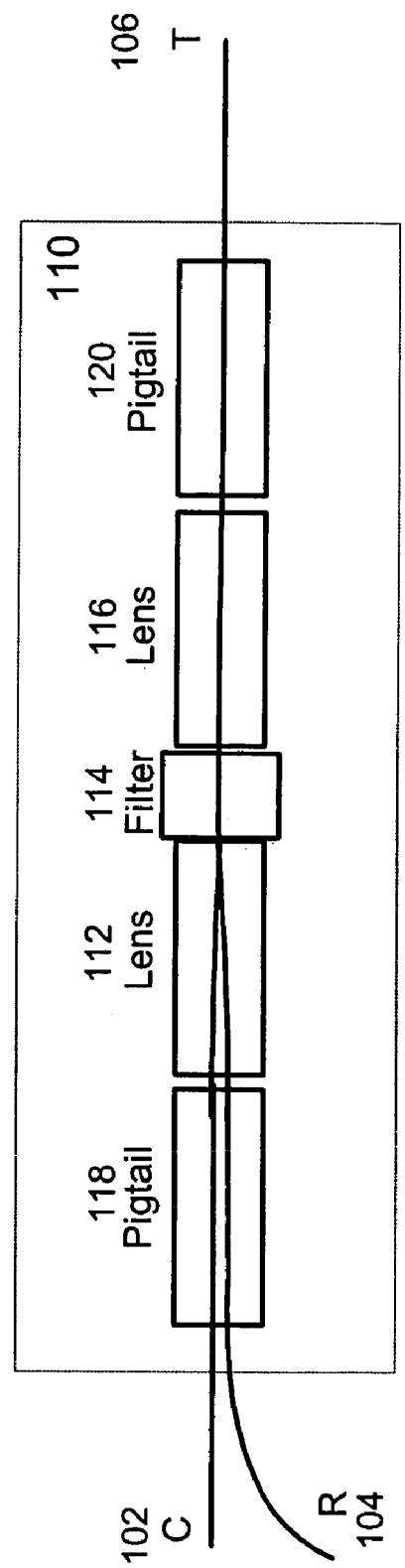
FIG. 2 shows an exemplary internal configuration of the optical device of FIG. 1.
Figure 5:
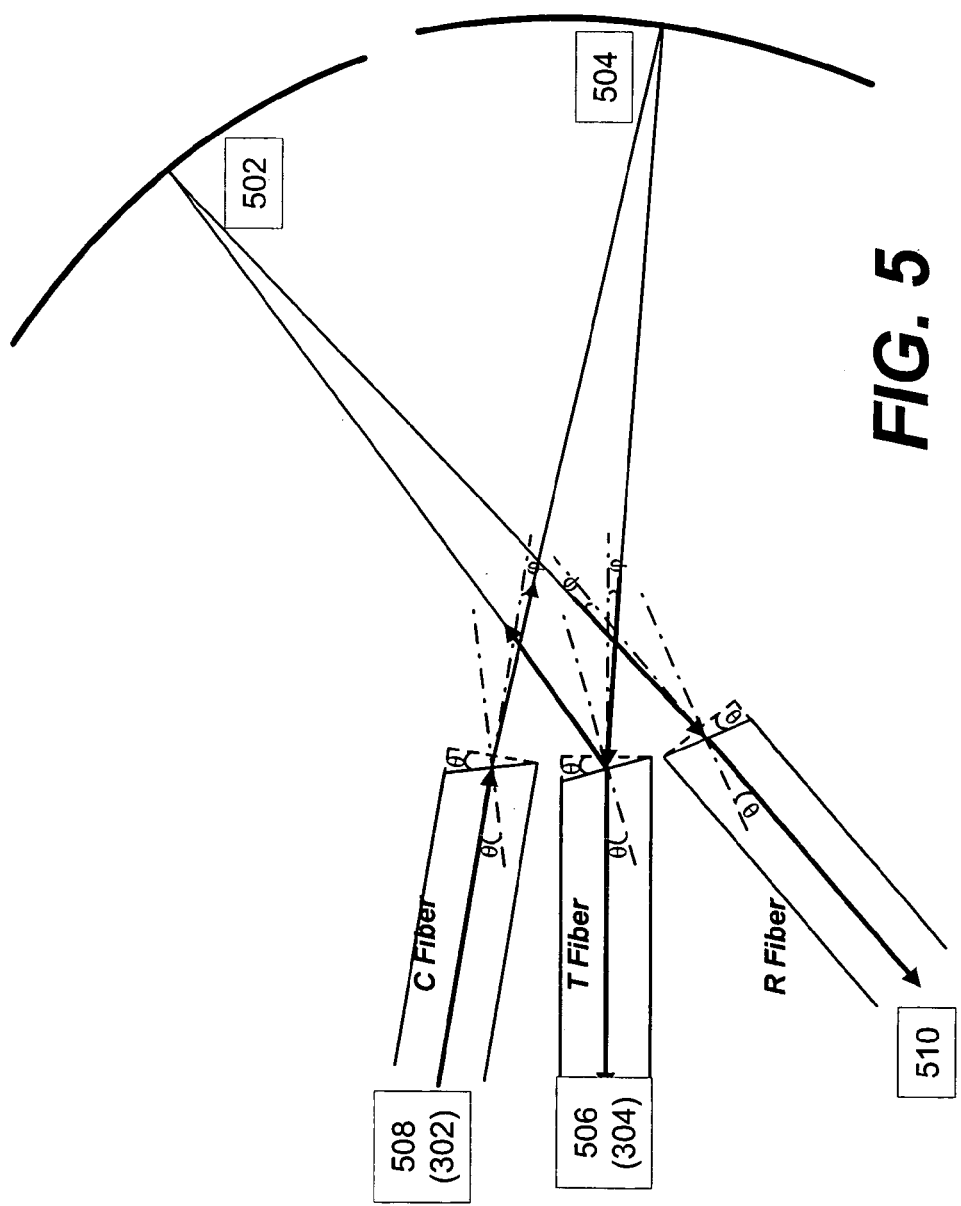
FIG. 5 shows a configuration involving two concave mirrors and is preferably understood in conjunction with FIGS. 3 and 4.

Referring now to FIG. 5, there shows a configuration 500 involving two concave mirrors 502 and 504. FIG. 5 shall be understood in conjunction with FIG. 3 and FIG. 4. A second concave mirror 502 may easily be placed next to the first concave mirror 504 to catch the reflected beam from the receiving fiber 506 corresponding to the fiber 302 of FIG. 2 or the fiber 400 of FIG. 4. The second concave mirror 502 couples the reflected light into a third fiber 510 labeled by "R".

There are many ways to place the second concave mirror 502 depending on how to position the receiving fiber 506. In one implementation, the receiving fiber 506 can be rotated about its incident beam axis without affecting the T-channel coupling. When the receiving fiber 506 is rotated about its B axis, the optical axis of the incident light beam or cone, its trajectory forms a circle, where the second concave mirror 502 can be placed with maximum optical coupling efficiency to the third fiber 510. FIG. 4 shows just an exemplary design of the present invention.

It is clear that the present invention, when used in constructing an add/drop device (e.g., a three-port device), can be cascaded to apply to multiple channels. As a result, two or more concave mirrors are needed for multiple channels to be added or dropped. According to one aspect of the present invention, each added channel does not need a new concave mirror. It can be appreciated by those skilled in the art that the concave mirrors can be shared by more channels, resulting in substantial savings.

Figure 6:
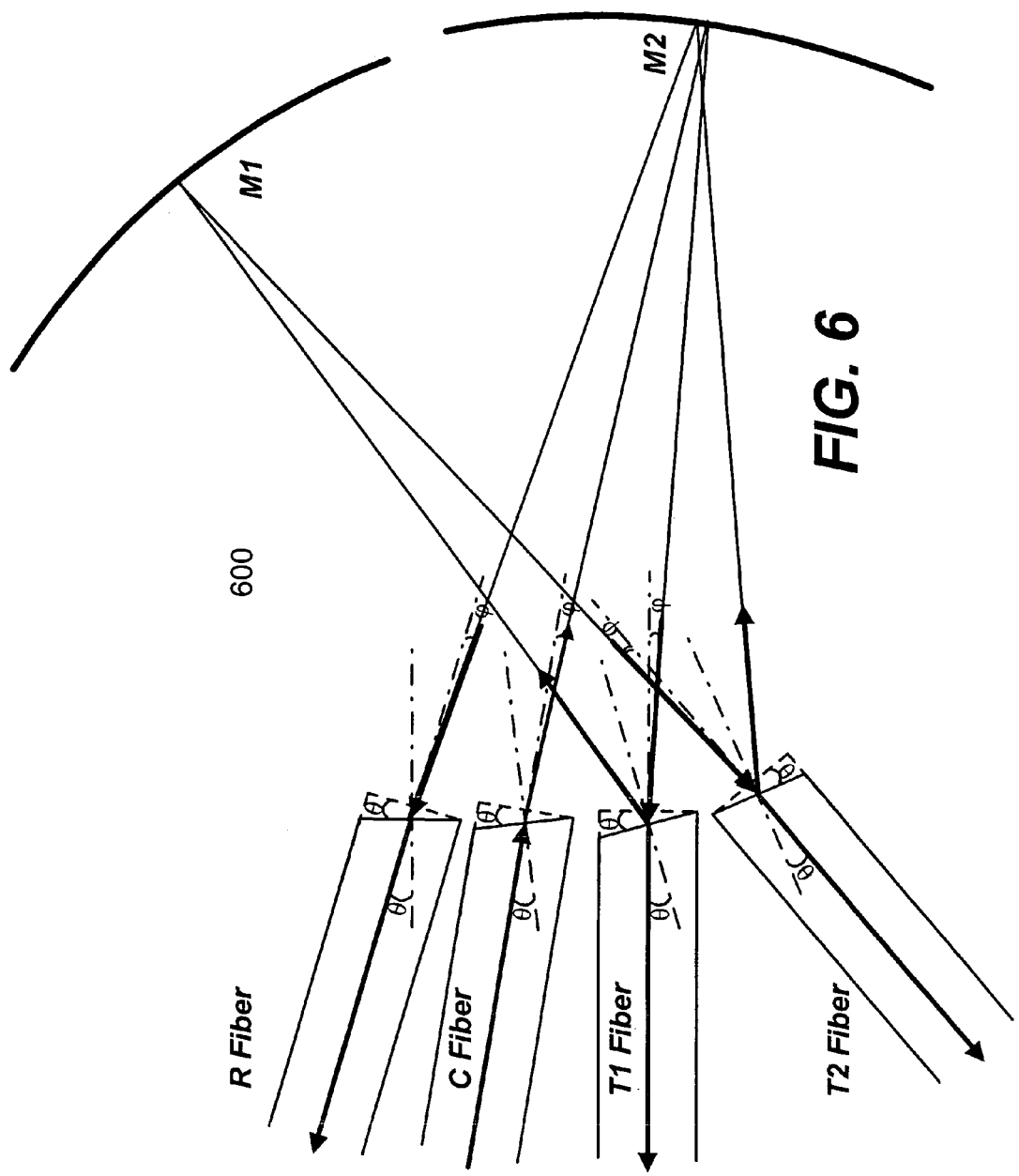
FIG. 6 shows another exemplary design, according to one embodiment of the present invention, to form a four port add/drop device.

An exemplary design 600 of a two-channel de-multiplexier is shown in FIG. 6, with two channels being dropped. It is understood to those skilled in the art that the exact configuration may be used as two-channel multiplexier if the two drop ports T1 and T2 are used for injecting two different wavelengths, rather than dropping two different wavelengths. It can also be observed that the configuration 600 may also be used as a four-port OADM multiplexier, with T1 as a dropping channel and T2 as an adding (injecting) channel, or vise versa.

It should be noted that all the fibers: R channel fiber, C channel fiber, T1 and T2 fibers in the configuration 600 shown in FIG. 6 are drawn in 2-dimensional for the purpose of easy illustration. In real application, the fibers are likely to be placed in a 3-dimensional space to have the fibers in close proximity so as to reduce the size of the concave mirrors while still maintaining low coupling loss.

In addition it is also possible to make concave mirror arrays instead of the single concave mirror structure used as the exemplary purpose in the foregoing description.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. Accordingly, the scope of the present invention is defined by the appended claims rather than the forgoing description of embodiments.

We claim:

1. An optical apparatus comprising:
   a first concave mirror;
   a first fiber emitting a light bean including wavelengths $\lambda_1, \lambda_2, \lambda_3, \ldots \lambda_k \ldots \lambda_n$ directly towards the first concave mirror without a collimator; and
   a second fiber coated at its facet with an optical filtering film configured to transmit a selected wavelength $\lambda_k$ and reflect all other wavelengths, the first concave mirror reflecting the light beam directly onto the second fiber, resulting in a signal at the selected wavelength $\lambda_k$ to transmit through.

2. The optical apparatus of claim 1, further including a second concave mirror and a third fiber.

3. The optical apparatus of claim 2, wherein signals at the other wavelengths are reflected by the optical filtering film to the second concave mirror that in return reflects these signals to the third fiber.

4. The optical apparatus of claim 2, wherein either one of the first and second concave mirrors has a shape being substantially similar to at least a portion of an oblate spheroid having a pair of foci.

5. The optical apparatus of claim 4, wherein each of the first and second fibers is positioned with its corresponding facet substantially near or on one of the foci.

6. The optical apparatus of claim 2, wherein either one of the first and second concave mirrors has a shape being substantially similar to at least a portion of sphere having a center.

7. The optical apparatus of claim 6, wherein the first and second fibers are positioned with their respective facets next to each other and substantially near or on the center.

8. The optical apparatus of claim 1, wherein the facet of the second fiber is slanted with respect to a mechanical axis thereof.

9. The optical apparatus of claim 8, wherein the light beam reflected from the first concave mirror is projected onto the facet of the second fiber at a small angle as an incident path with respect to the mechanical axis.

10. The optical apparatus of claim 9, further including a second concave mirror and a third fiber, and signals at the other wavelengths are reflected by the optical filtering film to the second concave mirror that in return reflects these signals to the third fiber.

11. The optical apparatus of claim 10, wherein these signals reflected by the optical filtering film go along with an outgoing optical path symmetric to the incident path about a surface normal of the slanted facet of the second fiber.

12. An optical apparatus comprising:
    a first concave mirror a second concave mirror;
    a first fiber emitting a light beam directly towards the first concave mirror without a collimator, the light beam including wavelengths $\lambda_1, \lambda_2, \lambda_3, \ldots \lambda_n$ that do not include a selected wavelength $\lambda_k$;
    a second fiber coated at its facet with an optical filtering film configured to transmit the selected wavelength $\lambda_k$ and reflect all other wavelengths, the second fiber emitting a signal at the selected wavelength $\lambda_k$ through the optical filtering film, the signal at the selected wavelength $\lambda_k$ being multiplexed with the light beam reflected by the first concave mirror to produce a multiplexed signal that goes to the second concave mirror; and
    a third fiber being positioned to receive the multiplexed signal directly that is reflected by the second concave mirror.

13. The optical apparatus of claim 12, wherein either one of the first and second concave mirrors has a shape being substantially similar to at least a portion of an oblate spheroid having a pair of foci.

14. The optical apparatus of claim 13, wherein each of the first and second fibers is positioned with its corresponding facet substantially near or on one of the foci.

15. The optical apparatus of claim 12, wherein either one of the first and second concave mirrors has a shape being substantially similar to at least a portion of sphere having a center.

16. The optical apparatus of claim 15, wherein the first and second fibers are positioned with their respective facets next to each other and substantially near or on the center.

17. The optical apparatus of claim 12, wherein the facet of the second fiber is slanted with respect to a mechanical axis thereof.

18. The optical apparatus of claim 17, wherein the light beam reflected from the first concave mirror is projected onto the facet of the second fiber at a small angle as an incident path with respect to the mechanical axis.

19. The optical apparatus of claim 18, wherein these signals reflected by the optical filtering film go along with an outgoing optical path symmetric to the incident path about a surface normal of the slanted facet of the second fiber.

20. A method for an optical apparatus, the method comprising:
    projecting from a first fiber a light beam including wavelengths $\lambda_1, \lambda_2, \lambda_3, \ldots \lambda_k \ldots \lambda_n$ directly towards a first concave mirror without going through a collimator; and
    providing a second fiber coated at its facet with an optical filtering film configured to transmit a selected wavelength $\lambda_k$ and reflect all others, the first concave mirror reflecting the light beam directly onto the second fiber, resulting in a signal at the selected wavelength $\lambda_k$ to transmit through.

21. The method of claim 20, wherein signals at the other wavelengths are reflected by the optical filtering film to a second concave mirror that in return reflects these signals to a third fiber.

22. The method of claim 21, wherein either one of the first and second concave mirrors has a shape being substantially similar to at least a portion of an oblate spheroid having a pair of foci.

23. The method of claim 20, wherein each of the first and second fibers is positioned with its corresponding facet substantially near or on one of the foci.

24. The method of claim 21, wherein either one of the first and second concave mirrors has a shape being substantially similar to at least a portion of sphere having a center.

25. The method of claim 24, wherein the first and second fibers are positioned with their respective facets next to each other and substantially near or on the center.

* * * * *